US005140754A

United States Patent [19]

Martenson

[11] Patent Number: 5,140,754

[45] Date of Patent: Aug. 25, 1992

[54] POWER TOOL PROTECTIVE HOOD POSITIONING SYSTEM AND METHOD OF MANUFACTURING THE SAME

[75] Inventor: Aaron C. Martenson, Charlotte, N.C.

[73] Assignee: Textron Inc., Providence, R.I.

[21] Appl. No.: 764,804

[22] Filed: Sep. 24, 1991

[51] Int. Cl.[5] .................. B23D 45/16; B23D 19/00; B2BD 55/04

[52] U.S. Cl. .................. 30/390; 51/268; 83/478

[58] Field of Search .................. 30/167, 390, 391; 51/170 PT, 268; 83/478, 49; 144/251 R; 74/567

[56] References Cited

U.S. PATENT DOCUMENTS

| | | | |
|---|---|---|---|
| 2,659,399 | 11/1953 | Doug | 143/159 |
| 2,926,709 | 3/1960 | Kaley | 143/159 |
| 3,177,909 | 4/1965 | Laube et al. | 143/159 |
| 3,382,578 | 5/1968 | Dobbertin | 30/167 |
| 3,513,888 | 5/1970 | Townsend et al. | 30/390 |
| 3,722,496 | 3/1973 | Schuman | 125/13 R |
| 3,735,489 | 5/1973 | Zatorsky, Jr. | 30/390 |
| 3,969,856 | 7/1976 | Zerrer | 83/478 |
| 3,969,856 | 7/1975 | Zerrer | 51/268 |
| 4,060,940 | 12/1977 | DeWitt | 51/268 |
| 4,402,241 | 9/1983 | Moores | 83/478 |
| 4,672,746 | 6/1987 | Zeilenga | 30/391 |
| 4,693,008 | 9/1987 | Velie | 30/390 |
| 4,856,394 | 8/1989 | Clowers | 30/390 |

*Primary Examiner*—Douglas D. Watts
*Assistant Examiner*—Paul M. Heyranksr
*Attorney, Agent, or Firm*—Perman & Green

[57] ABSTRACT

A hood for a power tool, such as a grinding wheel on a saw, in which the hood is rotatable relative to the frame of the tool. The tool has a system for repositionably fixing the hood at selected locations. The system includes a detent connected to the hood with a plurality of lock notches and a longitudinally movable lock pin connected to the frame. The lock pin can be positioned into one of the detent notches to prevent the hood from moving and, can be longitudinally moved to disconnect the lock pin from the detent thus allowing the hood to be repositioned. The system includes a knob to axially rotate the lock pin, a cam member to longitudinally move the lock pin upon axial rotation, and a leaf spring to bias the lock pin in an engaged lock position with the hood detent.

22 Claims, 2 Drawing Sheets

POWER TOOL PROTECTIVE HOOD POSITIONING SYSTEM AND METHOD OF MANUFACTURING THE SAME

BACKGROUND OF THE INVENTION

1. Field of the Invention

The present invention relates to power tools and, more particularly, to a system adapted to reposition a protective hood of a power tool and method of manufacturing the same.

2. Prior Art

U.S. Pat. No. 3,382,578 to Dobbertin discloses a power driven cutter tool with a safety shield. The tool has a knob on a clamp to adjust the shield. U.S. Pat. No. 3,969,856 to Zerrer discloses an adjustable protective hood with an arresting device comprising a handle and having an arresting element with a clamping surface. U.S. Pat. No. 4,060,940 to DeWitt discloses a tool with an adjustable guard. A knob is used to friction hold the guard in place. U.S. Pat. No. 4,402,241 to Moores, Jr. discloses a spindle lock with a spring biased pin. U.S. Pat. No. 3,177,909 Laube et al. discloses a spring biased pin used to lock a guard in position. Olympyk Corporation sells cut-off saws with a detent plate spot welded to its wheel guard. A pivotally mounted panel on an arm is used to lock and unlock the hood and arm.

A problem exists in the prior art in that prior art mechanisms for respositionally mounting a guard or hood have a relatively large number of parts or, the parts are relatively large and thus heavy. This increases the weight and size of the tool. For a tool such as a hand carried demolition saw, a heavy tool exhausts a worker more rapidly than a lighter tool.

Another problem exists in the prior art in that clamp or friction type fixing systems, although allowing repositioning of a guard or hood, do not provide a good assured fixation at all times and, are susceptible to wear and fatigue over prolonged use and time.

It is therefore an objective of the present invention to provide a new and improved system for repositioning a protective hood of a power tool and a method of manufacturing the same.

SUMMARY OF THE INVENTION

The foregoing problems are overcome and other advantages are provided by a new and improved system for repositioning a protective hood of a power tool and a method of manufacturing the same.

In accordance with one embodiment of the present invention, a power tool is provided comprising a frame, a motor, a circular cutting member, a hood, and means for repositionably fixing the position of the hood relative to the frame. The motor is connected to the frame. The circular cutting member is operably connected to the motor. The hood is rotatably connected to the frame and, at least partially, covers the cutting member. The means for repositionably fixing includes the hood having a plurality of lock member receiving areas and the frame having a lock member movably connected thereto. The lock member is adapted to be removably positioned into the receiving areas such that, when the lock member is located in one of the receiving areas, the hood is prevented from rotating relative to the frame and, the lock member can be removed from a receiving area to allow the hood to be repositioned relative to the frame.

In accordance with another embodiment of the present invention, a system for repositionably fixing a movable protective hood relative to a frame of a power tool is provided. The system comprises a locking member, means for biasing the locking member in a locked position, and means for moving the locking member from the locked position to an unlocked position. The means for biasing can bias the locking member in a locked position to lock the position of the hood relative to the frame. The means for moving includes a cam surface adapted to at least partially move the locking member.

In accordance with another embodiment of the present invention, a system for repositionably fixing a movable protective hood relative to a frame of a power tool is provided. The system comprises a detent plate, and a movement control. The detent plate is connected to the hood and has a plurality of notches. The movement control is connected to the frame and comprises a locking pin, a control knob connected to the locking pin, and means for longitudinally moving the locking pin into and out of the detent plate notches upon rotation of the control knob.

In accordance with one method of the present invention, a method of manufacturing a power tool is provided comprising steps of connecting a protective hood to a frame of the power tool, the hood having detent locking holes on one side thereof and the frame having means for rotating the hood relative to the frame about a first axis of rotation; and connecting a locking pin to the frame, the locking pin being axially longitudinally movable relative to the frame and having a front end adapted to be positioned in the detent locking holes at an offset from the first axis of rotation to prevent the hood from rotating relative to the frame.

DETAILED DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
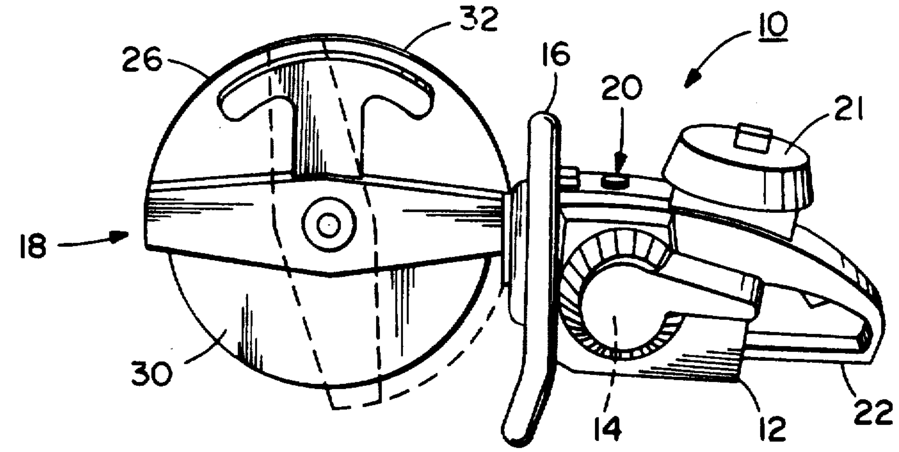
FIG. 1 is a side view of a demolition saw incorporating features of the present invention.

Referring to FIG. 1, there is shown a side view of a demolition saw 10 incorporating features of the present invention. Although the present invention will be described with reference to the single embodiment shown in the drawings, it should be understood that the present invention can be used in various different types of power tools and is not limited to use in demolition saws. In addition, it should also be understood that the present invention is not limited to hand-held power tools but may also be used with other types of power tools or other types of machines having rotating or cutting members that may require a repositional guard or protective hood. The present invention may also be incorporated into various different types of embodiments. In addition, any suitable size, shape or type of elements or materials may be used to practice the present invention as further described below.

The demolition saw 10 shown in FIG. 1 generally comprises a frame 12, a motor 14, a front handle 16, and a front wheel portion 18. The motor 14, in the embodiment shown, is an internal combustion engine with a fuel tank 20 and an air filter 21. The frame 12, in the embodiment shown, is comprised of multiple members that are connected to each other and generally house the motor 14. The front handle 16 is fixedly mounted to the frame 12 and forms a rear handle 22.

Figure 2:
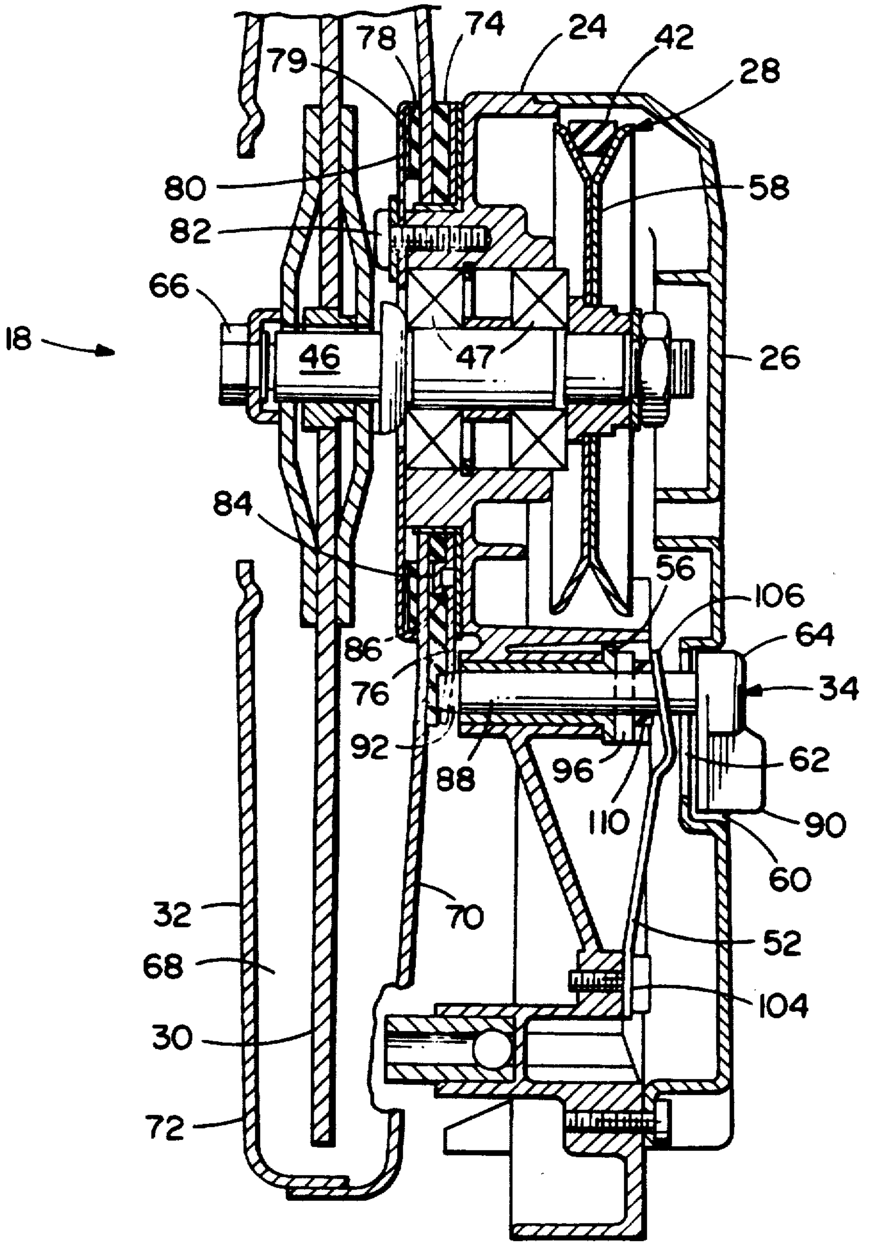
FIG. 2 is a cross sectional view of the front wheel portion of the demolition saw shown in FIG. 1.
Figures 3, 4:
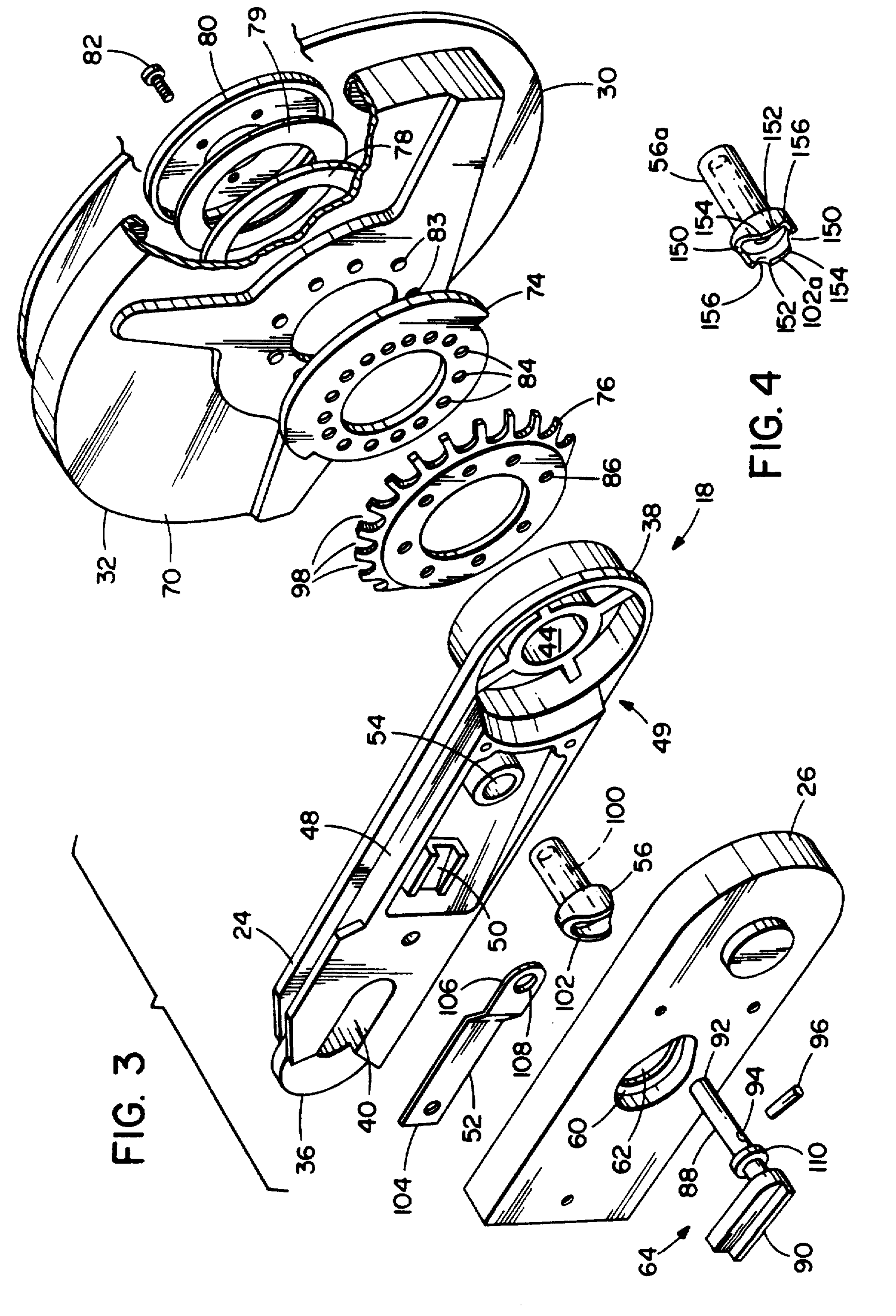
FIG. 3 is an exploded perspective view of portions of the front wheel portion of the demolition saw shown in FIG. 1.
FIG. 4 is a perspective view of an alternate form of cam sleeve for use in the embodiment shown in FIGS. 1-3.

Referring also to FIGS. 2 and 3, the front wheel portion 18 generally comprises a front wheel arm 24 that forms part of the frame 12, a cover plate 26, a drive system 28, a cutting wheel 30, a protective hood or guard 32, and a hood positive repositioning system 34.

The front wheel arm 24 has a rear end 36 and a front end 38. The rear end 36 has a channel 40 such that fasteners (not shown) can be passed therethrough to fixedly, but repositionably mount the arm 24 to the remainder of the frame 12. The repositionable feature of the arm 24 allows the arm 24 to be moved to provide appropriate tension to drive belt 42. The front end 38 also has a channel 44 for receiving a front driven shaft 46 and its bearings 47. The arm 24 is adapted to allow the drive belt 42 to move proximate its top and bottom sides 48 and 49. The arm 24 also has a guide 50 for leaf spring 52 and a cam channel 54 for receiving cam sleeve 56.

The cover plate 26 is adapted to be fixedly connected to the front arm 24 in order to cover the drive belt 42 and driven pulley 58 of the front drive system 28. In the embodiment shown, the cover plate 26 has a depression 60 having a general shape of a pie piece with a hole 62 therethrough. The depression 60 and hole 62 are intended to movably receive a lock control 64. The front drive system 28 generally comprises front driven shaft 46, bearings 47, driven pulley 58 and drive belt 42. The drive belt 42 is connected to a drive pulley (not shown) that is connected to the motor 14. The driven pulley 58 has the belt 42 thereon and is connected to the driven shaft 46. Thus, the motor 14 can rotate the drive pulley (not shown) which, in turn, causes the drive belt 42 to rotate between the drive pulley and the driven pulley 58, thus rotating the driven shaft 46 connected thereto. The bearings 47 allow the driven shaft 46 to rotate in the arm channel 44. The cutting wheel 30 is fixedly, but removably mounted to the driven shaft 46 by nut 66. The cutting wheel or blade 30 is a circular disk adapted to cut material such as concrete, stone, asphalt, steel, etc. As the driven shaft 46 rotates, it rotates the cutting wheel 30. However, any suitable drive system can be provided.

The protective hood 32 is generally semi-circular shaped with an interior chamber 68. The hood 32 to rotatably mounted to the arm 24 with the same axis of rotation as the driven shaft 46. In the embodiment show, the hood 32 has a first wall 70 proximate the arm 24 and a second wall 72 with the chamber 68 therebetween. The first wall 70 has an adjuster pad 74 and adjuster detent 76 connected thereto. Located inside the chamber 68 against the first wall 70 are a plastic washer 79, a rubber washer 78 and a spring washer or plate 80. The spring washer 80 is fixedly connected to the arm 24 by screws 82. The rubber washer 78 is biased by the spring washer 80 to hold the first wall 70 against the arm 24, but nonetheless allow the hood 32 to be rotatable. The plastic washer 79 provides a suitable surface to allow plate 80 to axially rotate relative to rubber washer 78. The hood 32 shrouds or covers a portion of the cutting wheel 30 inside the chamber 68, but allows a portion of the wheel 30 to extend therefrom such that the exposed area of the wheel 30 can be used for cutting. However, any suitable type of protective hood or mounting of the hood to the frame could be provided.

The first wall 70, in the embodiment shown, has a plurality of studs 83. The adjuster pad 74, in the embodiment shown, has a plurality of notches 84. The adjuster detent 76 has a plurality of lateral protrusions 86 that are located in every other notch 84. The studs 83 are also located in every other notch 84, at an offset to the protrusions 86, such that the notches 84 are alternatingly filled, at least partially, with protrusions 86 and studs 83. The interlocking nature of the studs 83 and protrusions 86 with the adjuster pad 74 provide the means for axially rotating the adjuster detent 76 with the hood 32. In the embodiment shown, the hood 32, pad 74, and detent 76 are merely retained together by the sandwiching effect between the plate 80 and arm 24. However, any suitable connection and/or interconnection means could be provided. When the hood 32 and adjuster pad 74 are rotated, the adjuster detent 76 rotates with them. The adjuster detent 76, in the embodiment shown, comprises a generally semi-circular array of notches or grooves 98. These notches 98 are suitably sized and shaped to receive a front end 92 of the locking pin 88 as further described below. However, any suitable type of adjuster detent could be provided or, the detent notches could be integrally formed with the hood 32.

The hood positive repositioning system 34 generally comprises the lock control 64 and the adjuster detent 76. The lock control 64 generally comprises locking pin 88, control knob 90, leaf spring 52, cam sleeve 56, and cam pin 96. The control knob 90 is fixedly connected to one end of the locking pin 88 and is adapted to be grasped by a user to axially rotate the locking pin 88. The control knob 90 sits partially recessed in the depression 60 of the cover 26. The locking pin 88 has a front end 92 and a cam pin channel 94. The front end 92 is adapted to be positioned in locking notches or grooves 98 of the adjuster detent 76 as will further be described below. The cam pin channel 94 is adapted to fixedly receive the cam pin 96 therein. The locking pin 88 is located in a center channel 100 of the cam sleeve 56 with the cam pin 96 positioned against the cam surface 102 of the cam sleeve 56. The cam surface 102, in the embodiment shown, has two types of areas, high areas and low areas. The cam surface 102, as best seen in FIG. 3, has two opposing high areas and two opposing low areas. In the position shown in FIG. 2, the ends of the cam pin 96 are located adjacent the low areas. The cam sleeve 56 is fixedly located in the cam channel 54 of the arm 24 such that the sleeve 56 is not able to axially rotate. The leaf spring 52 has a first end 104 that is fixedly connected to the arm 24 and a second end 106. The second end 106 has a pin hole or notch 108 to allow the locking pin 88 to pass therethrough. The second end 106, in the embodiment shown, is positioned between the control knob 90 and pin 96. A spacer 110 is sandwiched between the leaf spring 52 and cam pin 96 with the spring 52 biasing the spacer 110 and cam pin 96 towards the hood 32 which, in turn, biases the front end 92 of the locking pin 88 towards the hood 32. In an alternate embodiment, any suitable type of cam system or biasing system could be provided and any suitable type of control could be provided. One type of alternate form of cam sleeve is shown in FIG. 4. In the cam sleeve 56*a* shown, the cam surface 102*a* has low areas 150, high areas 152, and a sloped surface 154 therebetween. Located at the high areas 152, in the embodiment shown, are notches 156. These notches 156 are adapted to receive the ends of the cam pin 96 therein to temporarily stationarily lock the lock control 64 in an unlocked position. This allows the user free use of both hands to rotate the hood 32 on the arm 24. Rotation of the lock control 64 by the user can relatively easily move the ends of the cam pins 96 back out of the notches 156 and into the low areas 150.

For the cutting saw 10 shown in FIG. 1, it may be desirable to adjust the protective hood 32 relative to the rest of the saw 10 in order to provide a more comfortable cutting angle and manipulation for the user. For example, if the user intended to cut an article directly in front of him, he might desire to reposition the hood 32 as shown by dotted lines in FIG. 1, thus leaving the cutting wheel 30 exposed directly in front of the rest of the saw 10. However, it is obviously very desirable not to have the hood 32 rotating once its position has been selected. The positioning system of the present invention allows relatively fast locking and unlocking of movement between the hood 32 and arm 24, but nonetheless provides an extremely good relative motion lock that does not significantly degrade with use, such as with friction locks.

In the position shown in FIG. 2, the hood 32 is locked relative to the arm 24 such that it is not able to rotate. This locked situation is accomplished do to the fact that the locking pin 88 is offset from the axis of rotation of the hood 32 and, it front end 92 is located in one of the detent grooves 98. As noted above, the adjuster detent 76 is substantially locked with the hood 32. The locking pin 88 is restrained from movement in all directions except axial movement because it is located in cam sleeve channel 100 and cam channel 54. Therefore, the hood 32 is prevented from rotating because the detent adjuster 76 is prevented from rotating due to its engagement by pin 88.

In order to reposition the hood 32, the user need only rotate the control knob 90 from its locked position shown in FIG. 2 to an unlocked position. In the embodiment shown, the angular rotation between the locked and unlocked position is about 90°. However, any suitable rotation angle could be provided. As the knob 90 is turned, the locking pin 88 is axially rotated. This causes the cam pin 96 to rotate in a direction transverse to its longitudinal axis. Because the cam sleeve 56 is fixed in the cam channel 54 such that it cannot axially rotate and, the cam pin 96 is biased against the cam surface 102, as the cam pin 96 moves it is displaced along the cam surface 102 from the low areas to the high areas of the cam surface 102. This causes the locking pin 88 to be longitudinally axially moved away from the hood 32 and adjuster detent 76. The leaf spring 52 merely deflects during this movement. Due to the longitudinal movement of the locking pin 88, the front end 92 of the pin 88 is moved out of the adjuster detent groove 98 that it was formerly located in. With the locking pin 88 no longer engaging the adjuster detent 76, the user can now reposition the hood 32 to a desired new position. The adjuster detent 76 moves with the hood 32 as it is rotated and, the wall 70 of the hood merely slides relatively to the spring washer 80.

Once the user has repositioned the hood 32 to its desired new position, the user then merely rotates the control knob 90 back towards its original position. As the locking pin 88 is axially rotated, the cam pin 96 is turned such that its ends move from the cam sleeve surface high areas back to the cam sleeve surface low areas. The leaf spring 52 is thus able to bias the cam pin 96 and locking pin 88 back towards the hood 32. The front end 92 of the locking pin 88 moves back into one of the adjuster detent grooves 98 to once again lock the hood 32 relative to the arm 24 such that it is prevented from rotating. The front end 92 of the locking pin 88 has beveled surfaces to help guide the front end 92 into the grooves 98. In the event that the front end 92 is positioned on top of a portion of the adjuster detent 76 between two grooves 98, this occurrence will be noticeable to the user due to the extended nature of the control knob 90. The user can then merely slightly rotate the hood 32 at which point the locking pin 88 will snap forward, being pushed by the leaf spring 52, when a groove 98 comes into registry with the front end 92 of the locking pin 88.

One of the advantages of the present invention is that the weight and size of the hood locking and repositioning system is substantially reduced. Unlike the prior art that used various assortments of handles, knobs and brackets, the present invention is relatively simple and easy to manufacture and use as well as reducing the weight of the tool. This can have significant advantage for a hand held tool. The weight of the hood can also be reduced by making the hood with thinner dimensions or different lighter material because the hood, by use of the system described above, is restrained on the arm between the pads 74 and 78 and, therefore, need not be as strong as in the prior art devices. Therefore, the hood can be provided lighter than in prior art devices. As noted above, although the present invention has been described with use in a demolition saw, it can also be used in various other tools as well as tools or machines that are not hand held.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A power tool comprising:

a frame;

a motor mounted to the frame;

a circular cutting member operably connected to the motor;

a hood rotatably connected to the frame about a first axis and, at least partially, covering the cutting member; and means for repositionably fixing the hood relative to the frame, the means for repositionably fixing includes the hood having a plurality of lock member receiving areas and the frame having a lock member movably connected thereto, the lock member having a longitudinal axis parallel to the first axis, the lock member having a lock portion adapted to be removably positioned into at least one of the receiving areas such that, when the lock portion is located in one of the receiving areas, the hood is prevented from rotating relative to the frame and, the lock member can be axially moved to remove the lock portion from one of the receiving areas to allow the hood to be repositioned relative to the frame, wherein the lock member is adapted to be axially rotated and the means for repositionably fixing further comprises a cam member adapted to longitudinally axially move the lock member upon axial rotation thereof.

2. A tool as in claim 1 wherein the frame includes an arm extending out in front of the motor and having the cutting member and hood connected thereto.

3. A tool as in claim 1 wherein the hood comprises a shell and a detent plate, the receiving areas being located in the detent plate.

4. A tool as in claim 1 wherein the lock member is connected to the frame for longitudinal axial movement.

5. A tool as in claim 1 wherein the hood in connected to the frame about a first axis of rotation and, the lock member is adapted to be positioned in the receiving areas at an offset from the first axis of rotation.

6. A tool as in claim 1 further comprising means to bias the lock member towards engagement with one of the receiving areas.

7. A system for repositionally fixing a movable protective hood relative to a frame of power tool, the system comprising:

a locking member;

means for biasing the locking member in a lock position to lock the position of the hood release to the frame; and means for moving the locking member from the locked position to an unlocked position, the means for moving including a cam surface adapted to at least partially move the locking member wherein the locking member is a pin with a front end adapted to engage a portion of the hood at an offset from an axis of rotation of the hood.

8. A system as in claim 7 wherein the means for moving the locking member includes a manually actuatable knob connected to the locking member.

9. A system as in claim 7 wherein the means for biasing includes a spring biasing the locking member towards the hood.

10. A system as in claim 9 wherein the spring is a leaf spring.

11. A system as in claim 7 wherein the means for moving the locking member includes a cam member having the cam surface thereon.

12. A system as in claim 7 wherein the means for moving has a cam pin connected to the locking member adapted contact the cam surface and longitudinally move the locking member upon axial rotation of the locking member.

13. A system for repositionably fixing a movable protective hood relative to a frame of a power tool, the system comprising:

a detent plate connected to the hood, the detent plate having a plurality of notches;

a movement control connected to the frame comprising a locking pin, a control knob connected to the locking pin, and means for longitudinally moving the locking pin into and out of the detent plate notches upon rotation of the control knob.

14. A system as in claim 13 wherein the detent plate notches are aligned in a substantially semi-circular array.

15. A system as in claim 13 wherein the movement control further includes a cam member and a cam pin connected to the locking pin such that axial rotation of the locking pin causes the cam pin to cooperate with the cam member and longitudinally move the locking pin.

16. A system as in claim 13 wherein the movement control further comprises a spring adapted to bias the locking pin into a locking position with the detent plate.

17. A system as in claim 13 wherein the detent plate includes projections to stationarily locate the detent plate relative to the hood.

18. A system as in claim 17 further comprising a washer located between the detent plate and the hood, the washer having holes for receiving the detent plate projections.

19. A system as in claim 18 wherein the hood includes studs located in at least some of the washer holes.

20. A system for repositionally fixing a movable protective hood relative to a frame of a power tool, the system comprising:

a locking member;

means for biasing the locking member in a lock position to lock the position of the hood relative to the frame; and means for moving the locking member from the locked position to an unlocked position, the means for moving including a cam surface adapted to at least partially move the locking member and a manually actuatable knob connected to the locking member.

21. A system for repositionally fixing a movable protective hood relative to a frame of a power tool, the system comprising:

a locking member;

means for biasing the locking member in a lock position to lock the position of the hood relative to the frame, the means for biasing including a spring biasing the locking member towards the hood; and means for moving the locking member from the locked position to an unlocked position, the means for moving including a cam surface adapted to at least partially move the locking member.

22. A system for repositionally fixing a movable protective hood relative to a frame of a power tool, the system comprising:

a locking member;

means for biasing the locking member in a lock position to lock the position of the hood relative to the frame; and means for moving the locking member from the locked position to an unlocked position, the means for moving including a cam member having a cam surface thereon adapted to at least partially move the locking member.

* * * * *